Patented Nov. 5, 1940

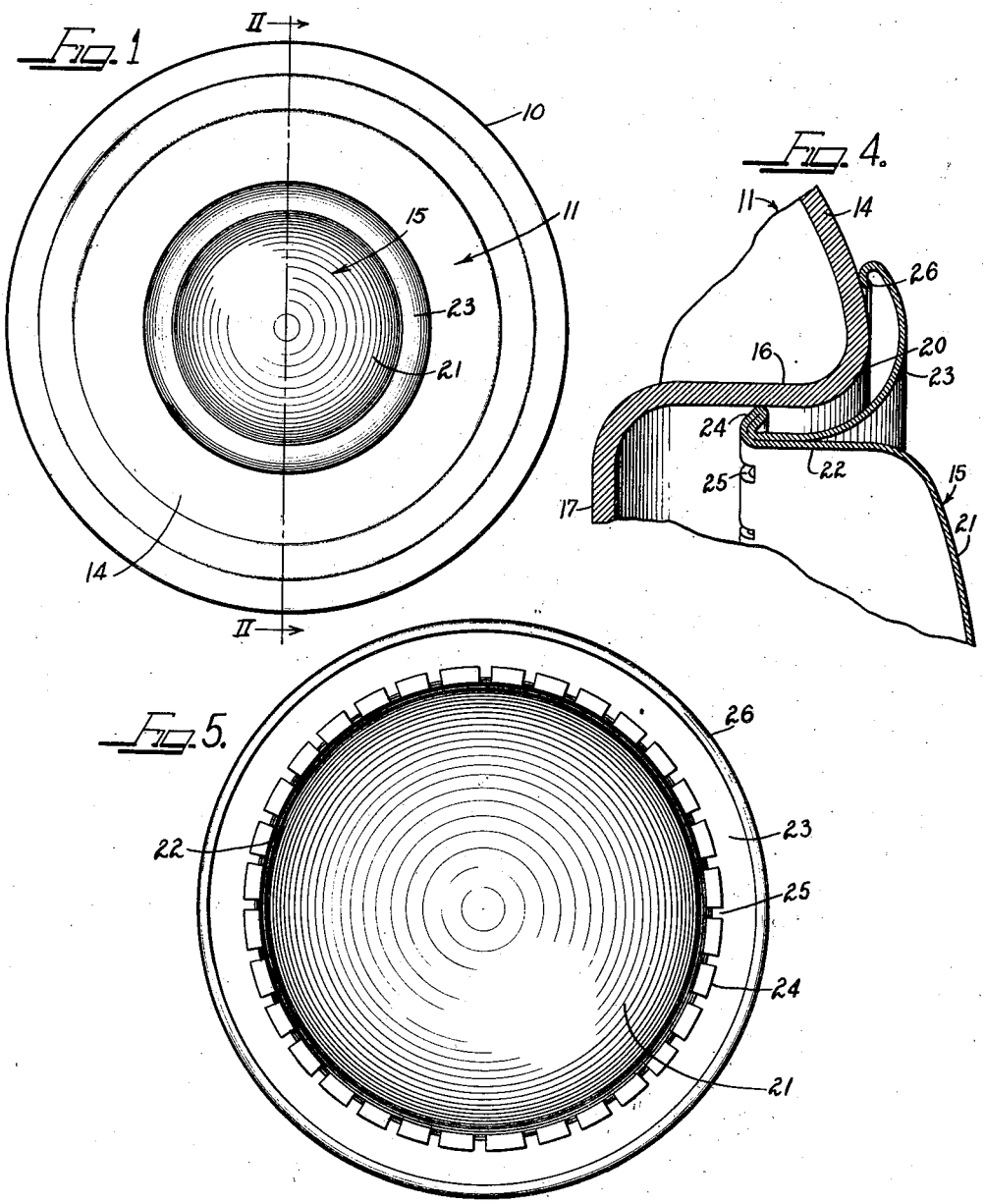

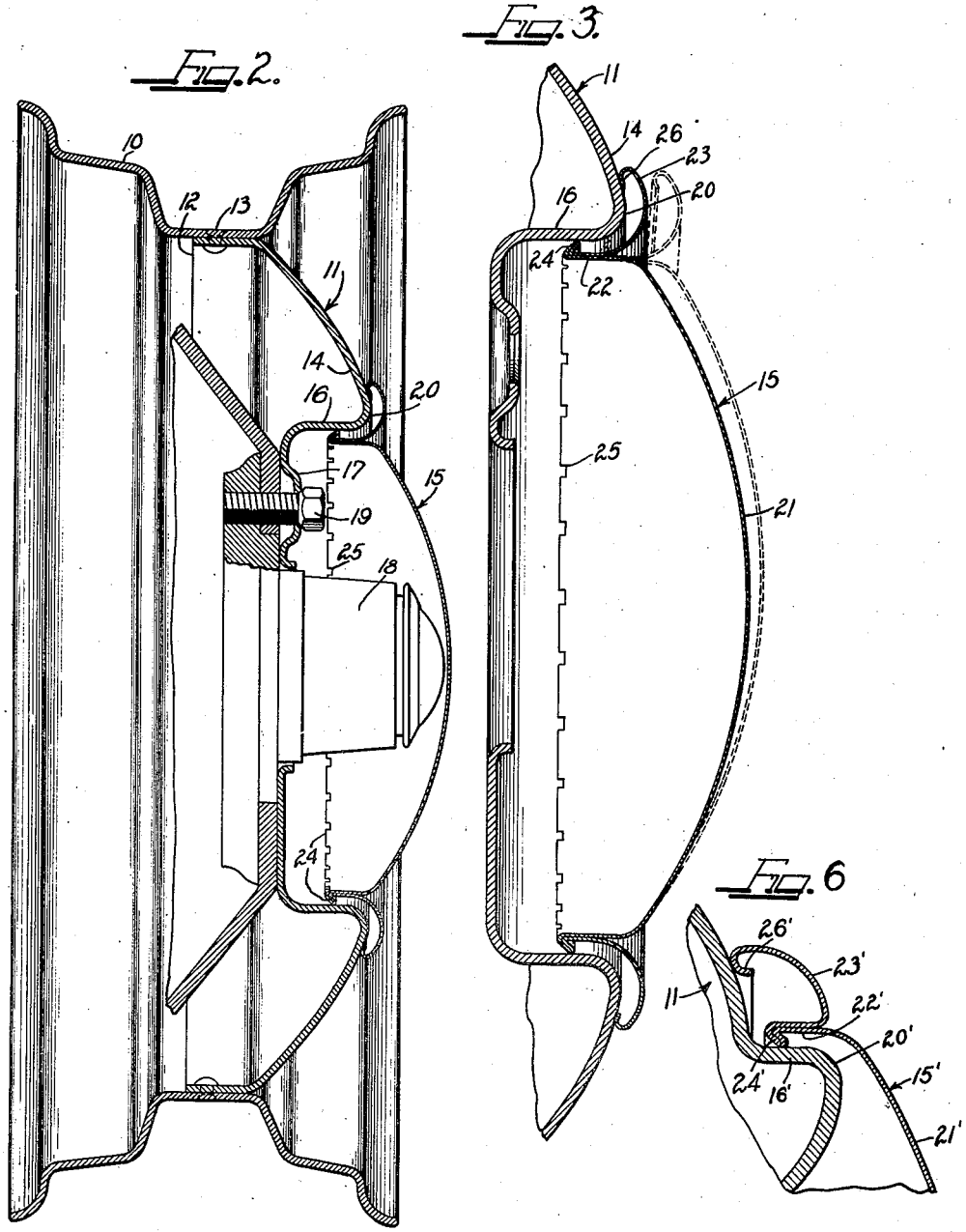

2,220,340

UNITED STATES PATENT OFFICE 2,220,340

WHEEL STRUCTURE

George Albert Lyon, Allenhurst, N. J.

Application November 2, 1938, Serial No. 238,301

3 Claims. (Cl. 301—108)

This invention relates to wheel structures, and more particularly to novel means in a wheel for detachably retaining the cover part in cooperation with the body part of the wheel.

An object of this invention is to provide a greatly simplified wheel structure wherein the cover part of the wheel may be detachably retained in position without necessitating the use of any separate springs or fastening means apart from the cover and wheel body part.

Still another object of this invention is to provide a wheel cover part with inherent resilient formation for detachably retaining it in position on a wheel body part, such formation constituting an integral portion of the cover part.

In accordance with the general features of this invention, there is provided a wheel including a central metallic shell or body part and a cover part detachably mounted thereon, said part including telescopic portions, with the portion on the cover part formed into a concealed turned edge wedged into frictional engagement with the cooperating portion of the body part, the turned edge being turned back on itself so as to be deflected radially upon engagement with the cooperating portion and being disengageable upon the prying of the cover part to an inclined position relative to the body part.

Another feature of the invention relates to the slotting of the turned edge of the foregoing cover part so as to increase its flexibility as well as to make it easier to apply the cover part to the wheel body part.

Another feature of the invention relates to the forming of the turned edge of a double thickness of material with the extremity of the edge formed blunt so as not to bite into the cooperating portion of the wheel body part.

Another feature of the invention relates to the provision of an axially extending surface on the body part so arranged relative to the turned edge on the cover part as to enable the turned edge to have sliding cooperation therewith on the application of the cover part to the body part and thereafter to have a tight resilience and frictional retaining engagement therewith.

Other objects and features of this invention will more fully appear from the following detailed description taken in connection with the accompanying drawings, which illustrate several embodiments thereof and in which:

Figure 1 is a front view of a wheel embodying this invention;

Figure 2 is an enlarged cross-sectional view taken on the line II—II of Figure 1 looking in the direction indicated by the arrows and illustrating fragmentarily the manner in which the wheel is fastened to a suitable support on the axle of a vehicle;

Figure 3 is an enlarged fragmentary view, partly in section, illustrating novel means I have provided for retaining the cover part on the wheel body part and also showing in dotted lines the manner in which the cover part may be removed;

Figure 4 is a still further enlarged view of the portion of the structure shown in Figure 3;

Figure 5 is a rear view of the cover part; and

Figure 6 is a fragmentary sectional view, similar to Figure 4, illustrating a modification of the invention.

In the drawings:

The reference character 10 designates a tire rim which is quite commonly referred to in the automobile trade as a drop-center type of rim. Secured to this rim so as to be functionally integral therewith is a wheel body part designated generally by the reference character 11. This body part 11 has an outer marginal flange 12 which may be suitably secured as by riveting, soldering or welding to the base of the rim. As illustrated, rivets 13 are provided for this purpose. Cooperating with the body part 11, which part is sometimes referred to in the trade as a hub part, a spider, or a shell, is a cover part 15 embodying the features of this invention. This cover part may extend clear out to the rim or may only cover the central portion of the body part 11, as is well known. It is sometimes referred to in the trade as a wheel disk, a hub cap, or a closure plate.

The body part 11 comprises a metallic stamping and includes a centrally bulged portion 14 connected by an axially extending portion 16 to a vertical mounting flange 17. The vertical mounting flange 17 may be secured in any suitable manner to the wheel support on the axle 18, as for example by means of cap screws 19, which may be six in number. These cap screws, as is well known, are spaced around the axis of the wheel.

The bulged portion 14 and the axially extending portion 16 of the body part 11 are connected to a rounded outer nose 20 of annular configuration. This rounded nose is adapted to aid in the alignment of the disk with the axially extending opening defined by the portion 16, as will be more evident in the progress of this description.

The cover part 15 likewise comprises a metallic stamping and includes a central crown portion 21 and an intermediate rearwardly and axially extending skirt or flange 22 and an outer marginal portion 23. The rearwardly projecting and concealed double thickness flange or skirt 22 may be formed in any suitable manner from the same material as the other portions of the cover part. One way of forming this skirt 22 is disclosed in my copending application Serial No. 211,781, filed June 4, 1938.

It will be noted that the skirt 22 has an outwardly turned double thickness edge 24. After this skirt and turned edge are formed on the cover part, the turned edge 24 may be slotted in any suitable manner. I have designated these slots by the reference character 25. The purpose of these slots is to increase the flexibility of the turned edge 24, as will become more evident with the progress of this description.

The outer extremity of the marginal portion 23 of the cover part 15 is formed into a turned edge 26 adapted to bear against the bulged portion 14 of the body part to limit the inward movement of the cover part relative to the wheel body part.

In the application of my cover part 15 to the body part 11, the turned edge 24 initially comes into contact with the rounded edge 20 which serves to guide the edge 24 toward the axially extending opening defined by the axial portion 16 of the wheel body part.

Thereafter, continued manual pressure on the cover part 15 toward the wheel in the direction of its axis results in the camming or flexing of the turned edge 24 as it is pressed inside of the recess defined by the portion 16 of the body part. The inclination of the turned edge 24 is such that this turned edge will readily enter the recess and once it is in position its extremity is frictionally bound to the inner surface of the portion 16.

The slots 25 in the turned edge 24 increase its flexibility and in reality provide this edge with a plurality of resilient projections which enable the outermost extremity of the turned edge 24 to be flexed to a smaller diameter, so that this turned edge may be wedgingly fitted within the recess defined by portion 16.

Also, once the cover part is in retained position on the body part, the fingers by reason of their inherent resiliency or, in other words, the turned edge is forced radially outward into tight binding engagement with the flat inner surface of the portion 16 defining the recess. This engagement is such in character as to resist any tendency for the cover part 15 to be moved in an axial direction out of position on the body part.

Hence, in order to remove the cover part 21, it is necessary to cock the same to the dotted position illustrated in Figure 3. This may be effected by inserting a suitable pry-off tool under the turned edge 26 on the outer margin of the cover part and forcibly prying it to the dotted position.

Thus, it will be perceived that I have provided a body part of a specific construction so that it will effectively cooperate with the flexible turned edge 24 and effecting such a flexing of that edge that the edge may be frictionally bound tightly to the inner surface of the axially extending portion 16 of the body part. An advantage of this structure, as has been noted hereinbefore, is that it eliminates the need for separate springs being mounted on the base or mounting flange 17, as is now the common practice in the manufacture of automobile wheels.

In Figure 6 I have illustrated a modification of the invention and have employed the same numerals as are employed in the preferred form to designate corresponding parts, with the exception that the numerals in this modification have been primed. The principal difference between this modification and the previously described form resides in the fact that the slotted turned edge 24' is fitted over the bulged portion 14' of the wheel body part instead of inside of it, as in the first form.

In this form of the invention, the body part 11 comprises a metallic stamping and is attached to a rim in the same manner as shown in Figure 2. The central portion of this body part is formed into a bulged portion 14', which may extend radially inward and be formed into a flange such as the flange 17 for mounting the body part on the wheel support or axle. The bulged portion 14' is connected radially outward thereof to an axially extending base portion 16' by a rounded annular nose 20' which serves the same purpose as the rounded portion 20 previously described.

In this modification, the cover part 15' includes a crown portion 21', an intermediate double thickness skirt 22' and an outer marginal portion 23' having a turned outer edge 26' adapted to bear against the wheel body part to limit the movement of the cap on the body part.

The double thickness flange and skirt 22' has an inwardly turned slotted edge 24' adapted to bear on the straight portion 16' of the body part for the purpose of wedging the cover part 15' to the body part.

The manner of mounting this form of cover part 15' on the body part and its coaction therewith is substantially the same as in the case of the first described form of the invention.

I claim as my invention:

1. In combination, a wheel including a tire rim supported on a central metallic shell or body part and a cover part detachably mounted thereon, said parts including telescoping portions, the portion on the cover part comprising an intermediate closed folded flange having a concealed double thickness turned rear edge wedged into frictional engagement with the cooperating portion of the body part, said cooperating part extending in an axial direction inwardly of the outermost surface of said body part, said turned edge being turned back on itself so as to be deflected radially into engagement with said cooperating portion and being disengageable upon the prying of the cover part to an inclined position relative to the body part, said cover part having its outer marginal edge formed to limit inward movement of the cover part on the body part.

2. In combination, a wheel including a tire rim supported on a body part having a depressed central portion providing a circular recess defined by an inward axially extending portion and a wheel cover therefor including central crown and outer marginal portions connected together by an intermediate double thickness folded flange extending axially rearwardly inside said recess and having an inner edge turned radially outward on an inclined angle for grippingly engaging the inner surface of said axially extending portion of said body part to retain said cover on the wheel.

3. In combination, a wheel including a tire rim supported on a body part having a depressed central portion providing a circular recess defined by an inward axially extending portion and a wheel cover therefor including central crown and outer marginal portions connected together by an intermediate double thickness folded flange extending axially rearwardly inside said recess and having an inner edge turned radially outward on an inclined angle for grippingly engaging the inner surface of said axially extending portion of said body part to retain said cover on the wheel, the outermost extremity of said edge being slotted to only a slight extent and in close proximity to said axially extending portion to increase the flexibility of said double thickness flange at said edge.

GEORGE ALBERT LYON.